(12) United States Patent
Hallstrom et al.

(10) Patent No.: US 9,863,297 B2
(45) Date of Patent: Jan. 9, 2018

(54) EMISSION TREATMENT SYSTEM

(75) Inventors: Kevin A. Hallstrom, Clinton, NJ (US); Sanath V. Kumar, North Brunswick, NJ (US); Susanne Stiebels, Adenbuttel (DE); Marius Vaarkamp, Burlington, NJ (US)

(73) Assignee: BASF Corporation, Florham Park, NJ (US)

( * ) Notice: Subject to any disclaimer, the term of this patent is extended or adjusted under 35 U.S.C. 154(b) by 1552 days.

(21) Appl. No.: 12/330,663

(22) Filed: Dec. 9, 2008

(65) Prior Publication Data

US 2009/0158719 A1    Jun. 25, 2009

Related U.S. Application Data

(60) Provisional application No. 61/012,947, filed on Dec. 12, 2007.

(51) Int. Cl.
*F01N 3/00* (2006.01)
*F01N 3/023* (2006.01)
(Continued)

(52) U.S. Cl.
CPC ....... *F01N 3/0231* (2013.01); *B01D 53/9477* (2013.01); *B01D 53/9495* (2013.01); *F01N 3/0821* (2013.01); *F01N 3/2066* (2013.01); *B01D 53/944* (2013.01); *B01D 53/945* (2013.01); *B01D 53/9418* (2013.01); *B01D 53/9436* (2013.01); *B01D 2251/2067* (2013.01); *B01D 2255/102* (2013.01); *B01D 2258/012* (2013.01); *F01N 2570/18* (2013.01);
(Continued)

(58) Field of Classification Search
CPC ...... B01D 2251/2067; B01D 2255/102; B01D 2258/012; B01D 53/9418; B01D 53/9436; B01D 53/944; B01D 53/945; B01D 53/9477; B01D 53/9495; F01N 2570/18; F01N 2610/02; F01N 3/0231; F01N 3/0821
USPC .......... 60/286, 295, 297, 311; 422/177, 180; 423/210

See application file for complete search history.

(56) References Cited

U.S. PATENT DOCUMENTS

| 4,329,162 A | 5/1982 | Pitcher, Jr. |
| 4,931,419 A | 6/1990 | Blanchard et al. |

(Continued)

FOREIGN PATENT DOCUMENTS

| JP | 2005/009407 | 1/2005 |
| JP | 2005009407 A | 1/2005 |

(Continued)

OTHER PUBLICATIONS

Keld Johansen, Novel Base Metal-Palladium Catalytic Diesel Filter Coating with NO2 Reducing Properties, Jul. 23, 2007, SAE International.*

(Continued)

*Primary Examiner* — Jesse Bogue
(74) *Attorney, Agent, or Firm* — Womble Bond Dickinson (US) LLP

(57) ABSTRACT

An emission treatment system and method for remediating the nitrogen oxides (NOx), particulate matter, and gaseous hydrocarbons present in diesel engine exhaust streams are described. The emission treatment system has an oxidation catalyst upstream of a soot filter upstream from a NOx reducing catalyst.

5 Claims, 10 Drawing Sheets

(51) Int. Cl.
*F01N 3/08* (2006.01)
*F01N 3/20* (2006.01)
*B01D 53/94* (2006.01)

(52) U.S. Cl.
CPC .......... *F01N 2610/02* (2013.01); *Y02C 20/10* (2013.01); *Y02T 10/22* (2013.01); *Y02T 10/24* (2013.01)

(56) References Cited

U.S. PATENT DOCUMENTS

| | | | |
|---|---|---|---|
| 4,961,917 A | 10/1990 | Byrne | |
| 4,963,332 A | 10/1990 | Brand et al. | |
| 5,100,632 A | 3/1992 | Dettling | |
| 5,462,907 A | 10/1995 | Farrauto et al. | |
| 5,491,120 A | 2/1996 | Voss et al. | |
| 5,516,497 A | 5/1996 | Speronello et al. | |
| 5,522,218 A | 6/1996 | Lane et al. | |
| 5,866,210 A | 2/1999 | Rosynsky et al. | |
| 5,875,057 A | 2/1999 | Kato | |
| 5,963,832 A | 10/1999 | Srinivasan et al. | |
| 6,087,298 A | 7/2000 | Sung et al. | |
| 6,415,602 B1 | 7/2002 | Patchett et al. | |
| 6,471,924 B1 | 10/2002 | Feeley et al. | |
| 6,478,874 B1 | 11/2002 | Rosynsky et al. | |
| 6,484,495 B2 * | 11/2002 | Minami ................... | 60/288 |
| 6,753,294 B1 * | 6/2004 | Brisley ............. | B01D 53/9431 502/400 |
| 6,877,313 B1 * | 4/2005 | Phillips et al. ............. | 60/297 |
| 6,904,752 B2 * | 6/2005 | Foster et al. ............... | 60/295 |
| 7,078,074 B2 | 7/2006 | Matsuzawa et al. | |
| 7,097,817 B2 | 8/2006 | Brisley et al. | |
| 7,198,764 B2 * | 4/2007 | Fisher et al. ............. | 422/186.04 |
| 7,229,597 B2 | 6/2007 | Patchett et al. | |
| 7,264,785 B2 | 9/2007 | Blakeman | |
| 7,534,738 B2 | 5/2009 | Fujdala et al. | |
| 7,611,680 B2 | 11/2009 | Jia et al. | |
| 7,930,881 B2 * | 4/2011 | Goersmann et al. .......... | 60/297 |
| 2004/0040289 A1 * | 3/2004 | Mazur et al. ................ | 60/295 |
| 2004/0052699 A1 * | 3/2004 | Molinier .............. | B01D 53/944 422/180 |
| 2004/0258594 A1 | 12/2004 | Andreasson et al. | |
| 2005/0031514 A1 | 2/2005 | Patchett et al. | |
| 2005/0056004 A1 * | 3/2005 | Kakwani et al. ............... | 60/286 |
| 2005/0069476 A1 | 3/2005 | Blakeman et al. | |
| 2005/0284138 A1 * | 12/2005 | Imai et al. ................ | 60/295 |
| 2006/0010859 A1 * | 1/2006 | Yan et al. ................ | 60/286 |
| 2006/0130458 A1 * | 6/2006 | Solbrig ................... | 60/286 |
| 2006/0153761 A1 | 7/2006 | Bandl-Konrad et al. | |
| 2006/0179825 A1 * | 8/2006 | Hu et al. ................... | 60/297 |
| 2007/0028604 A1 * | 2/2007 | Twigg ............... | B01D 53/9472 60/297 |
| 2007/0062180 A1 * | 3/2007 | Weber et al. .................. | 60/286 |
| 2007/0240406 A1 * | 10/2007 | Zhang et al. .................. | 60/297 |
| 2007/0243115 A1 | 10/2007 | Tsumagari et al. | |
| 2007/0245724 A1 * | 10/2007 | Dubkov .............. | B01D 53/944 60/299 |
| 2007/0251218 A1 * | 11/2007 | Driscoll et al. ................ | 60/286 |
| 2007/0277507 A1 * | 12/2007 | Yan ................. | 60/286 |
| 2008/0045405 A1 * | 2/2008 | Beutel et al. ................ | 502/103 |
| 2008/0256935 A1 * | 10/2008 | Oger et al. .................. | 60/299 |
| 2009/0151341 A1 * | 6/2009 | Kim et al. ................... | 60/301 |
| 2009/0288402 A1 * | 11/2009 | Voss et al. .................. | 60/299 |
| 2010/0101218 A1 * | 4/2010 | Gabe et al. .................. | 60/286 |
| 2012/0023909 A1 * | 2/2012 | Lambert et al. ............... | 60/274 |
| 2013/0061576 A1 * | 3/2013 | Gonze et al. .................. | 60/286 |

FOREIGN PATENT DOCUMENTS

| | | |
|---|---|---|
| JP | 2005-042687 | 2/2005 |
| WO | 2005016497 A | 2/2005 |
| WO | WO 2005/016497 | 2/2005 |

OTHER PUBLICATIONS

Non-Final Office Action in U.S. Appl. No. 12/484,710, dated Jun. 8, 2012, 11 pgs.
Final Office Action in U.S. Appl. No. 12/484,710, dated Oct. 4, 2012, 11 pgs.
Non-Final Office Action in U.S. Appl. No. 12/484,710, dated Jul. 9, 2013, 14 pgs.
Final Office Action in U.S. Appl. No. 12/484,710, dated Feb. 28, 2014, 11 pgs.

* cited by examiner

EMISSION TREATMENT SYSTEM

This application claims the benefit of priority under 35 U.S.C. §119(e) to U.S. Patent Application No. 61/012,947, filed Dec. 12, 2007, which is hereby incorporated by reference in its entirety.

BACKGROUND

The present invention relates to an emission treatment system having a Diesel Oxidation Catalyst (DOC) positioned upstream from a Catalyzed Soot Filter (CSF), which is positioned upstream from a Selective Catalytic Reduction (SCR) catalyst. In one or more embodiments, the system provides an effective method of simultaneously remediating the nitrogen oxides ($NO_x$), particulate matter, CO and gaseous hydrocarbons present in diesel engine exhaust streams.

Diesel engine exhaust is a heterogeneous mixture which contains not only gaseous emissions such as carbon monoxide ("CO"), unburned hydrocarbons ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the reduction of $NO_x$.

Oxidation catalysts that contain platinum group metals, base metals and combinations thereof are known to facilitate the treatment of diesel engine exhaust by promoting the conversion of both HC and CO gaseous pollutants and some proportion of the particulate matter through oxidation of these pollutants to carbon dioxide and water. Such catalysts have generally been contained in units called diesel oxidation catalysts (DOC's), which are placed in the exhaust of diesel engines to treat the exhaust before it vents to the atmosphere. In addition to the conversions of gaseous HC, CO and particulate matter, oxidation catalysts that contain platinum group metals (which are typically dispersed on a refractory oxide support) also promote the oxidation of nitric oxide (NO) to $NO_2$.

The total particulate matter emissions of diesel exhaust are comprised of three main components. One component is the solid, dry, solid carbonaceous fraction or soot fraction. This dry carbonaceous matter contributes to the visible soot emissions commonly associated with diesel exhaust. A second component of the particulate matter is the soluble organic fraction ("SOF"). The soluble organic fraction is sometimes referred to as the volatile organic fraction ("VOF"), which terminology will be used herein. The VOF can exist in diesel exhaust either as a vapor or as an aerosol (fine droplets of liquid condensate) depending on the temperature of the diesel exhaust. It is generally present as condensed liquids at the standard particulate collection temperature of 52° C. in diluted exhaust, as prescribed by a standard measurement test, such as the U.S. Heavy Duty Transient Federal Test Procedure. These liquids arise from two sources: (1) lubricating oil swept from the cylinder walls of the engine each time the pistons go up and down; and (2) unburned or partially burned diesel fuel.

The third component of the particulate matter is the so-called sulfate fraction. The sulfate fraction is formed from small quantities of sulfur components present in the diesel fuel and oil. Small proportions of $SO_3$ are formed during combustion of the diesel, which in turn combines rapidly with water in the exhaust to form sulfuric acid. The sulfuric acid collects as a condensed phase with the particulates as an aerosol, or is adsorbed onto the other particulate components, and thereby adds to the mass of TPM.

One key aftertreatment technology in use for high particulate matter reduction is the diesel particulate filter. There are many known filter structures that are effective in removing particulate matter from diesel exhaust, such as honeycomb wall flow filters, wound or packed fiber filters, open cell foams, sintered metal filters, etc. However, ceramic wall flow filters, described below, receive the most attention. These filters are capable of removing over 90% of the particulate material from diesel exhaust. The filter is a physical structure for removing particles from exhaust, and the accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Provisions are generally introduced to lower the soot burning temperature in order to provide for passive regeneration of the filter. The presence of a catalyst promotes soot combustion, thereby regenerating the filters at temperatures accessible within the diesel engine's exhaust under realistic duty cycles. In this way a catalyzed soot filter (CSF) or catalyzed diesel particulate filter (CDPF) is effective in providing for >80% particulate matter reduction along with passive burning of the accumulating soot, and thereby promoting filter regeneration.

Future emissions standards adopted throughout the world will also address $NO_x$ reductions from diesel exhaust. A proven $NO_x$ abatement technology applied to stationary sources with lean exhaust conditions is Selective Catalytic Reduction (SCR). In this process, $NO_x$ is reduced with ammonia ($NH_3$) to nitrogen ($N_2$) over a catalyst typically composed of base metals. The technology is capable of $NO_x$ reduction greater than 90%, and thus it represents one of the best approaches for achieving aggressive $NO_x$ reduction goals. SCR is under development for mobile applications, with urea (typically present in an aqueous solution) as the source of ammonia. SCR provides efficient conversions of $NO_x$ as long as the exhaust temperature is within the active temperature range of the catalyst, the operating window.

New emission regulations for diesel engines around the world are forcing the use of more advanced emission controls systems. These systems will need to reduce both total particulate matter and NOx by about 90 percent. The engine manufacturers have multiple emission system options to meet the new regulations but one option is the combination of an active filter system for particulate reduction and a selective catalytic reduction system.

One system configuration that has been proposed in the literature involves a diesel oxidation catalyst (DOC) positioned downstream from the engine, a catalyzed soot filter (CSF) positioned downstream from the DOC, a reductant injection system position downstream from the CSF, a selective catalytic reduction (SCR) catalyst positioned downstream from the reductant injection system, and an optional ammonia oxidation (AMOX) catalyst positioned downstream from the SCR catalyst. The system also typically includes a hydrocarbon injection system located downstream from the engine and upstream from the DOC.

This system configuration offers several advantages for the overall system functionality. Having the DOC in the first position allows it to be placed as close as possible to the engine ensuring rapid heat up for cold start HC and CO emissions and the maximum DOC inlet temperature for active filter regeneration. The CSF being in front of the SCR will prevent particulate, oil ash and other undesirable materials from being deposited on the SCR catalyst thus improving its durability and performance. Having oxidation catalysts in front of the SCR allows for an increase in the $NO_2$ to NO (or $NO_2$ to NOx ratio entering the SCR which is known to increase the reaction rate of the NOx reduction occurring in the SCR if properly controlled. An example of such a system is described in United States Patent Application Publication Number 2005/0069476.

There is an ongoing need to investigate and provide alternative system strategies to improve the treatment of exhaust gas streams containing NOx and particulate matter.

SUMMARY OF THE INVENTION

Applicants have determined that in systems such as the type in which a DOC is located upstream from a CSF, which is located upstream from an SCR catalyst, the optimal control of the NO to $NO_2$ ratio entering the filter can be an issue with the large volume of oxidation catalyst that is present in the DOC and CSF in front of the SCR. According to one or more embodiments of the invention, better control of the NO to $NO_2$ ratio of the exhaust gas flowing into the SCR is provided by using a novel combination of a DOC and a CSF. Thus, embodiments of the invention are directed toward emission treatment systems for treatment of an exhaust stream from an engine, the exhaust stream comprising $NO_x$ and particulate matter. The emission treatment system comprises a diesel oxidation catalyst located downstream from the engine. The $NO_x$ is comprised of at least NO and $NO_2$. The DOC is placed within the path of the exhaust gas stream. The diesel oxidation catalyst is effective to produce substantially no additional $NO_2$ in the exhaust gas stream after passing through the diesel oxidation catalyst. The DOC operates in this manner over about 90% of the operating window of the diesel oxidation catalyst. A catalyzed soot filter is located downstream from the diesel oxidation catalyst. The CSF has a plurality of longitudinally extending passages bounded by longitudinally extending walls. The passages comprises inlet passages having an open inlet end and a closed outlet end, and outlet passages having a closed inlet end and an open outlet end. The catalyzed soot filter comprises an oxidation catalyst composition on the walls, the catalyzed soot filter is effective to optimize the ratio of NO to $NO_2$ exiting the filter. A $NO_x$ reducing catalyst is located downstream from the catalyzed soot filter.

The emission treatment system, according to other embodiments, has a selective catalytic reduction catalyst as the $NO_x$ reducing catalyst.

Further embodiments of an emission treatment system also include a reductant injection system. The reductant injection system is located between the catalyzed soot filter and the $NO_x$ reducing catalyst. In some embodiments including a reductant injection system, an ammonia oxidation catalyst is disposed downstream from the $NO_x$ reducing catalyst.

Detailed embodiments of the emission treatment system exhibit a gas exhaust stream exiting the catalyzed soot filter with a $NO/NO_2$ ratio between about 0.6 and about 1.4. In more detailed embodiments, the $NO/NO_2$ ratio is about 0.7 to about 1.3. Still more detailed embodiments have the $NO/NO_2$ ratio exiting the catalyzed soot filter targeted at about 1:1. It will be understood, of course, that the invention is not limited to a particular $NO/NO_2$ ratio, and higher and lower ratios are possible.

Further embodiments of the invention are directed toward methods of treating an exhaust stream from a diesel engine, where the exhaust stream comprising $NO_x$ and particulate matter. The methods comprise disposing a diesel oxidation catalyst within the exhaust stream. The diesel oxidation catalyst produces little or no additional $NO_2$ in the exhaust stream. A catalyzed soot filter is disposed downstream from the diesel oxidation catalyst. The catalyzed soot filter has a plurality of longitudinally extending passages bounded by longitudinally extending walls. The passages comprise inlet passages having an open inlet end and a closed outlet end, and outlet passages having a closed inlet end and an open outlet end, the catalyzed soot filter comprising a catalyst composition on the walls. The catalyzed soot filter is effective to optimize the ratio of NO to $NO_2$ exiting the filter. A selective catalytic reduction catalyst is disposed downstream from the catalyzed soot filter. The methods further comprise passing the exhaust stream from the diesel engine through the DOC, the CSF and SCR.

Further embodiments comprise disposing a reductant injection system between the catalyzed soot filter and the selective catalytic reduction catalyst. The reductant injection system periodically adds, or meters, a reductant into the exhaust stream exiting the catalyzed soot filter. Some embodiments of this variety also have an ammonia oxidation catalyst located downstream from the SCR catalyst.

Additional embodiments are to methods of treating an exhaust gas stream from a diesel engine, where the exhaust gas stream comprising $NO_x$ and particulate matter. These methods comprise suppressing the $NO_2$ production of the exhaust gas passing through a diesel oxidation catalyst and controlling the $NO/NO_2$ ratio through a downstream catalyzed soot filter. This enhances the control of a downstream selective catalytic reduction catalyst.

Further embodiments include the metering of a reductant into the exhaust stream. The reductant may be added prior to selective catalytic reduction catalyst. Some embodiments of this sort also include oxidizing any residual reductant after the selective catalytic reduction catalyst.

Detailed embodiments of the methods have the $NO/NO_2$ ratio controlled from about 0.6 to about 1.4. In additional detailed embodiments, the $NO/NO_2$ ratio is controlled from about 0.7 to about 1.3, or from about 0.8 to about 1.2.

DETAILED DESCRIPTION OF THE INVENTION

Figure 1:
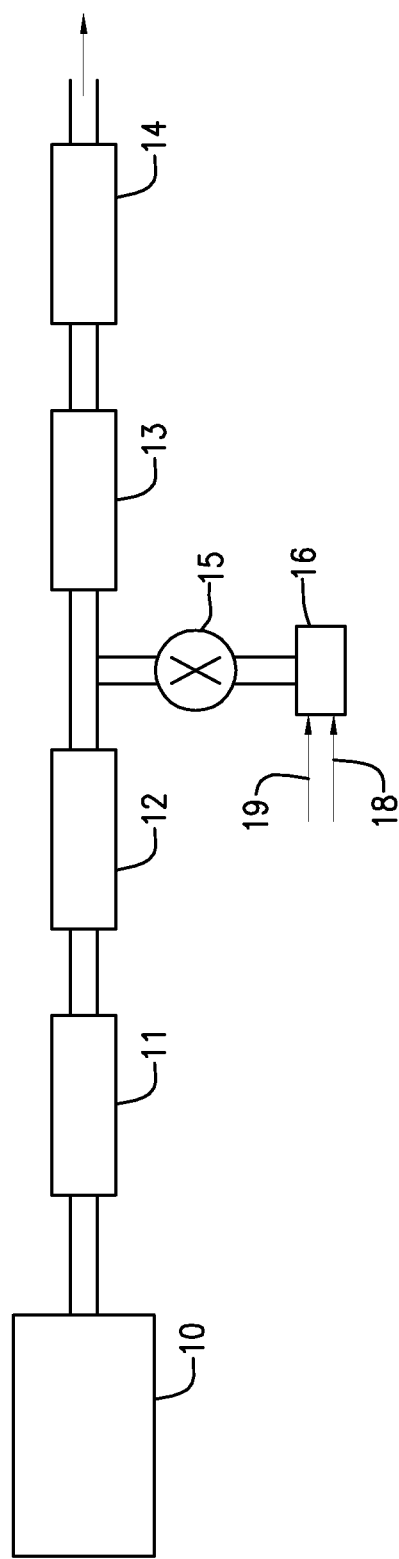
FIG. 1 is a schematic depiction of an embodiment of an emission treatment system according to an embodiment of the invention.

Before describing several exemplary embodiments of the invention, it is to be understood that the invention is not limited to the details of construction or process steps set forth in the following description. The invention is capable of other embodiments and of being practiced or being carried out in various ways.

"Activated alumina" has its usual meaning of a high BET surface area alumina, comprising one or more of gamma-, theta- and delta aluminas.

"BET surface area" has its usual meaning of referring to the Brunauer, Emmett, Teller method for determining surface area by $N_2$ absorption. Unless otherwise specifically stated, all references herein to the surface area of the catalyst support components or other catalyst components means the BET surface area.

"Bulk form," when used to describe the physical form of a material (e.g., ceria), means the material is present as discrete particles that can be as small as 1 to 15 microns in diameter or smaller, as opposed to having been dispersed in solution onto another material such as gamma alumina. By way of example, in some embodiments of the invention, particles of ceria are admixed with particles of gamma alumina so that ceria is present in bulk form, as opposed to, for example, impregnating alumina particles with aqueous solutions of ceria precursors which upon calcination are converted to ceria disposed on the alumina particles.

When present in a catalyst, "cerium component" means one or more oxides of cerium (e.g., $CeO_2$).

"Downstream" and "Upstream," when used to describe an article, catalyst substrate or zone, refer to the relative positions in the exhaust system as sensed in the direction of the flow of the exhaust gas stream. When a catalyst or catalyst zone is "downstream" or "upstream" from another catalyst or zone, it may be on a different substrate or brick or on a different region of the same substrate or brick.

"High surface area support" means support materials with a BET surface area that is approximately greater than 10 $m^2/g$, for example, greater than 150 $m^2/g$.

"Platinum group metal component" or "PGM" refers to the platinum group metals or oxides thereof. Suitable platinum group metal components are platinum, palladium, rhodium iridium components, and combinations thereof.

"Diesel oxidation catalyst" or "DOC" refers to a catalyst promoting oxidation processes in diesel exhaust, to reduce emissions of the organic fraction of diesel particulates, gas-phase hydrocarbons, and/or carbon monoxide.

"Active regeneration" refers to the introduction of a combustible material (e.g., diesel fuel) into the exhaust and burning it across an oxidation catalyst to generate an exotherm from that provides heat (e.g. about 500-700° C.) needed to burn particulate matter such as soot from the filter An ammonia destruction catalyst or AMOX refers to a catalyst that promotes the oxidation of $NH_3$.

"Particulate filter" or "soot filter" is a filter designed to remove particulate matter from an exhaust gas stream such as soot, and particulate filters include, but are not limited to honeycomb wall flow filters, partial filtration filter, a wire mesh filter, wound fiber filters, sintered metal filters; and foam filters.

As used herein, "operating window" refers to the temperature and space velocity values encountered by the catalytic component during operation of the engine. The temperature of the operating window can vary between 0° C. and 800° C., and the space velocity can vary between 0 and 1,000,000/hour.

To meet future Heavy Duty emission regulations around the world it will be necessary to utilize particulate reduction and $NO_x$ reduction emission control system. One approach is the utilization of an active particulate filter system plus a Selective Catalytic Reduction system. This system can be configured in numerous ways but a configuration in the following order—Diesel Oxidation Catalyst (DOC)—Catalyzed Soot Filter (CSF)—Urea Injection—Selective Catalytic Reduction Catalyst (SCR)—with or without an Ammonia Oxidation Catalyst (AMOX) seems to offer attractive design benefits.

Embodiments of this invention utilize a DOC that is specifically designed to burn fuel for active regeneration of the filter by fuel injection either in-cylinder in the engine or post injection in the exhaust with minimal or no $NO_2$ production across the DOC such that $NO_2$ DOC out has negligible or no affect on particulate oxidation in the filter. The CSF is specifically designed to optimize the $NO/NO_2$ ratio out of the filter to facilitate optimal $NO_x$ reduction across the SCR system.

Embodiments of the invention relate to an emission treatment system that effectively provides simultaneous treatment of the particulate matter, the $NO_x$ and other gaseous components of diesel engine exhaust. Due to the choice of catalytic compositions implemented in the system, effective pollutant abatement is provided for exhaust streams of varying temperatures. This feature is advantageous for operating diesel vehicles under varying loads and vehicle speeds which significantly impact exhaust temperatures emitted from the engines of such vehicles.

One embodiment of the inventive emission treatment system is schematically depicted in FIG. 1. As can be seen in FIG. 1, the exhaust containing gaseous pollutants (including unburned hydrocarbons, carbon monoxide and $NO_x$) and particulate matter is conveyed from the engine 10 to an oxidation catalyst 11. In the oxidation catalyst 11, unburned gaseous and non-volatile hydrocarbons (i.e., the VOF) and carbon monoxide are largely combusted to form carbon dioxide and water. Removal of substantial proportions of the VOF using the oxidation catalyst, in particular, helps prevent too great a deposition of particulate matter on the soot filter 12 (i.e., clogging), which is positioned downstream in the system. In addition, substantially no $NO_2$ is generated in the oxidation catalyst. For instance, the amount of $NO_2$ entering the oxidation catalyst is substantially the same or less than the amount exiting the oxidation catalyst.

The exhaust stream is conveyed to the soot filter 12. On passing through the soot filter, particulate matter is filtered and the gas contains approximately equal ratios of NO to $NO_2$.

The particulate matter including the soot fraction and the VOF are also largely removed (greater than 80%) by the soot filter. The particulate matter deposited on the soot filter is combusted through the regeneration of the filter, the temperature at which the soot fraction of the particulate matter combusts is lowered by the presence of the catalyst composition disposed on the soot filter.

In the embodiment show in FIG. 1, a reductant, in this case ammonia, is injected as a spray via a nozzle (not shown) into the exhaust stream downstream of the soot filter. Aqueous urea shown on one line 18 can serve as the ammonia precursor which can be mixed with air on another line 19 in a mixing station 16. Valve 15 can be used to meter precise amounts of aqueous urea which are converted in the exhaust stream to ammonia.

Downstream of the soot filter 12 is a selective catalytic reduction catalyst (SCR). The exhaust gas containing NO and $NO_2$ is reduced to $N_2$ in the SCR.

The emission treatment system may be equipped with a slip oxidation catalyst 14 downstream of the SCR catalyst 13. The slip oxidation catalyst can be coated, for example, with a composition containing base metals and less than 0.5 wt % of platinum. This provision can be used to oxidize any excess $NH_3$ before it is vented to the atmosphere.

Suitable SCR catalyst compositions for use in the system are able to effectively catalyze the reduction of the $NO_x$ component, so that adequate $NO_x$ levels can be treated even under conditions of low load which typically are associated with lower exhaust temperatures. In one or more embodiments, the catalyst article is capable of converting at least 50% of the $NO_x$ component to $N_2$, depending on the amount of reductant added to the system. In addition, SCR catalyst compositions for use in the system are also ideally able to aid in the regeneration of the filter by lowering the temperature at which the soot fraction of the particulate matter is combusted. Another desirable attribute for the composition is that it possesses the ability to catalyze the reaction of $O_2$ with any excess $NH_3$ to $N_2$ and $H_2O$, so that $NH_3$ is not emitted to the atmosphere.

Useful SCR catalyst compositions used in the system also have thermal resistance to temperatures greater than 650° C. Such high temperatures are often encountered during the regeneration of soot filters. Additionally, SCR catalyst compositions should resist degradation upon exposure to sulfur components, which are often present in diesel exhaust gas compositions.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, a specific example being from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations.

Zeolites used in such compositions are resistant to sulfur poisoning, sustain a high level of activity for the SCR process, and are capable of oxidation of excess ammonia with oxygen. Specific, non-limiting examples of such zeolites include USY, Beta and ZSM-20. Additional examples of suitable SCR catalysts include zeolite having the CHA structure, for example SSZ-13, and non-zeolitic molecular sieves having the CHA structure, for example silicoaluminophosphates such as SAPO-34, SAPO-18, SAPO-44. Particular, non-limiting examples are materials having the CHA structure that are promoted with Cu and/or Fe, for example Cu/SSZ-13 and Cu/SAPO-34, Cu/SAPO-18 and CuSAPO-44.

Wall flow substrates useful for supporting the SCR catalyst compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. An example of a suitable wall flow substrate has a wall thickness of between about 0.002 and 0.015 inches.

Figure 2:
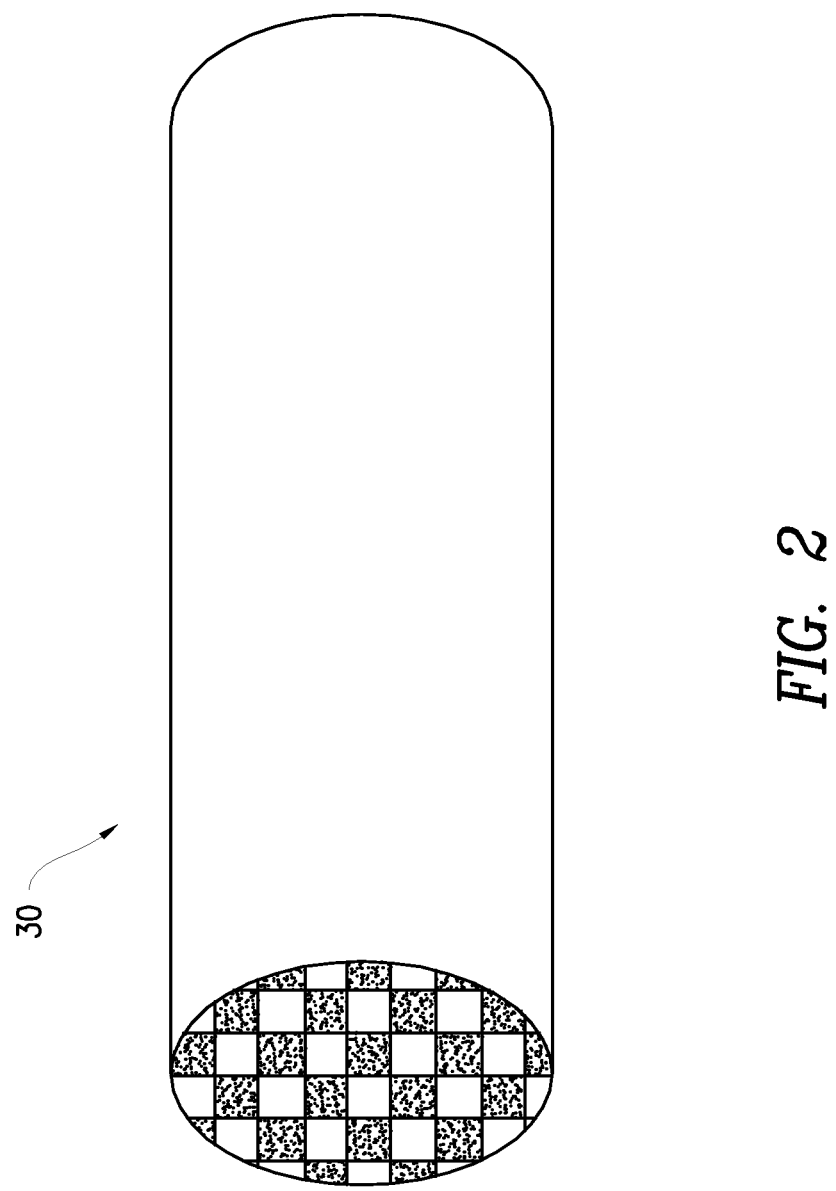
FIG. 2 shows a perspective view of a wall flow filter substrate.
Figure 3:
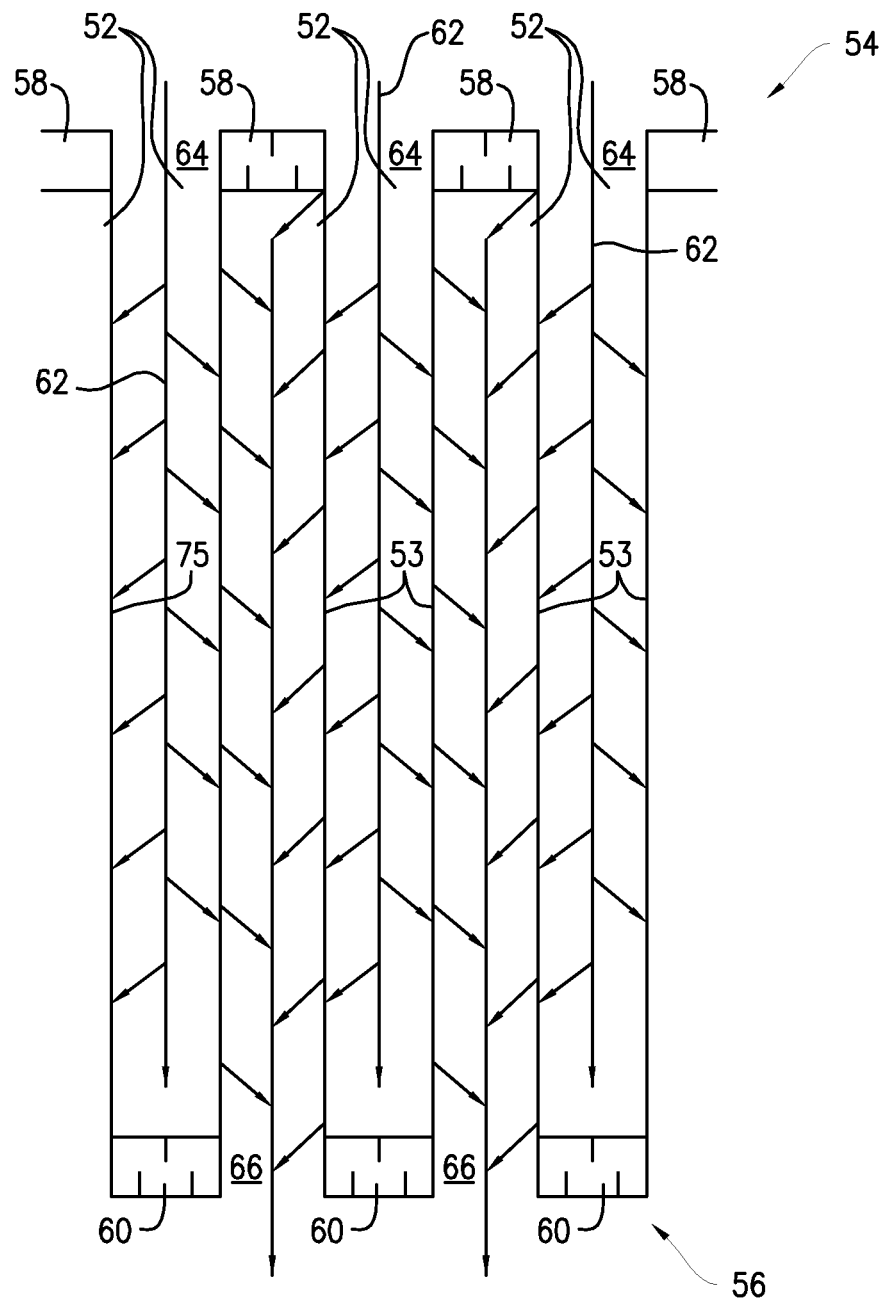
FIG. 3 shows a cutaway view of a section of a wall flow filter substrate.

FIGS. 2 and 3 illustrate a wall flow filter substrate 30 which has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Suitable wall flow filter substrates are composed of ceramic-like materials such as cordierite, α-alumina, silicon carbide, silicon nitride, zirconia, mullite, spodumene, alumina-silica-magnesia, aluminum titanate or zirconium silicate, or of any other suitable porous, refractory metal. Wall flow substrates may also be formed of ceramic fiber composite materials. Suitable wall flow substrates are formed from cordierite and silicon carbide. Such materials are able to withstand the environment, particularly high temperatures, encountered in treating the exhaust streams.

Suitable wall flow substrates for use in the inventive system include thin porous walled honeycombs (monoliths) through which the fluid stream passes without causing too great an increase in back pressure or pressure across the article. Normally, the presence of a clean wall flow article will create a back pressure of 1 inch water column to 10 psig. Ceramic wall flow substrates used in the system may be formed of a material having a porosity of at least 50% (e.g., from 50 to 75%) having a mean pore size of at least 5 microns (e.g., from 5 to 30 microns). When substrates with these porosities and these mean pore sizes are coated with the techniques described below, adequate levels of SCR catalyst compositions can be loaded onto the substrates to achieve excellent $NO_x$ conversion efficiency. These substrates are still able retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Suitable wall flow filters may be formed with lower wall porosities, e.g., from about 35% to 50%, than the wall flow filters utilized in the invention. In general, the pore size distribution of a suitable commercial wall flow filter is very broad with a mean pore size smaller than 17 microns.

The porous wall flow filter used according to embodiments of this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with a catalyst composition, the substrates are immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry typically permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can be determined be through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

A reductant dosing system is provided downstream of the soot filter and upstream of the SCR catalyst to inject a $NO_x$ reductant into the exhaust stream. As disclosed in U.S. Pat. No. 4,963,332, $NO_x$ upstream and downstream of the catalytic converter can be sensed, and a pulsed dosing valve can be controlled by the upstream and downstream signals. In alternative configurations, the systems disclosed in U.S. Pat. No. 5,522,218, where the pulse width of the reductant injector is controlled from maps of exhaust gas temperature and engine operating conditions such as engine rpm, transmission gear and engine speed. Reference is also made to the discussion of reductant pulse metering systems in U.S. Pat. No. 6,415,602, the discussion of which is hereby incorporated by reference.

Figure 4:
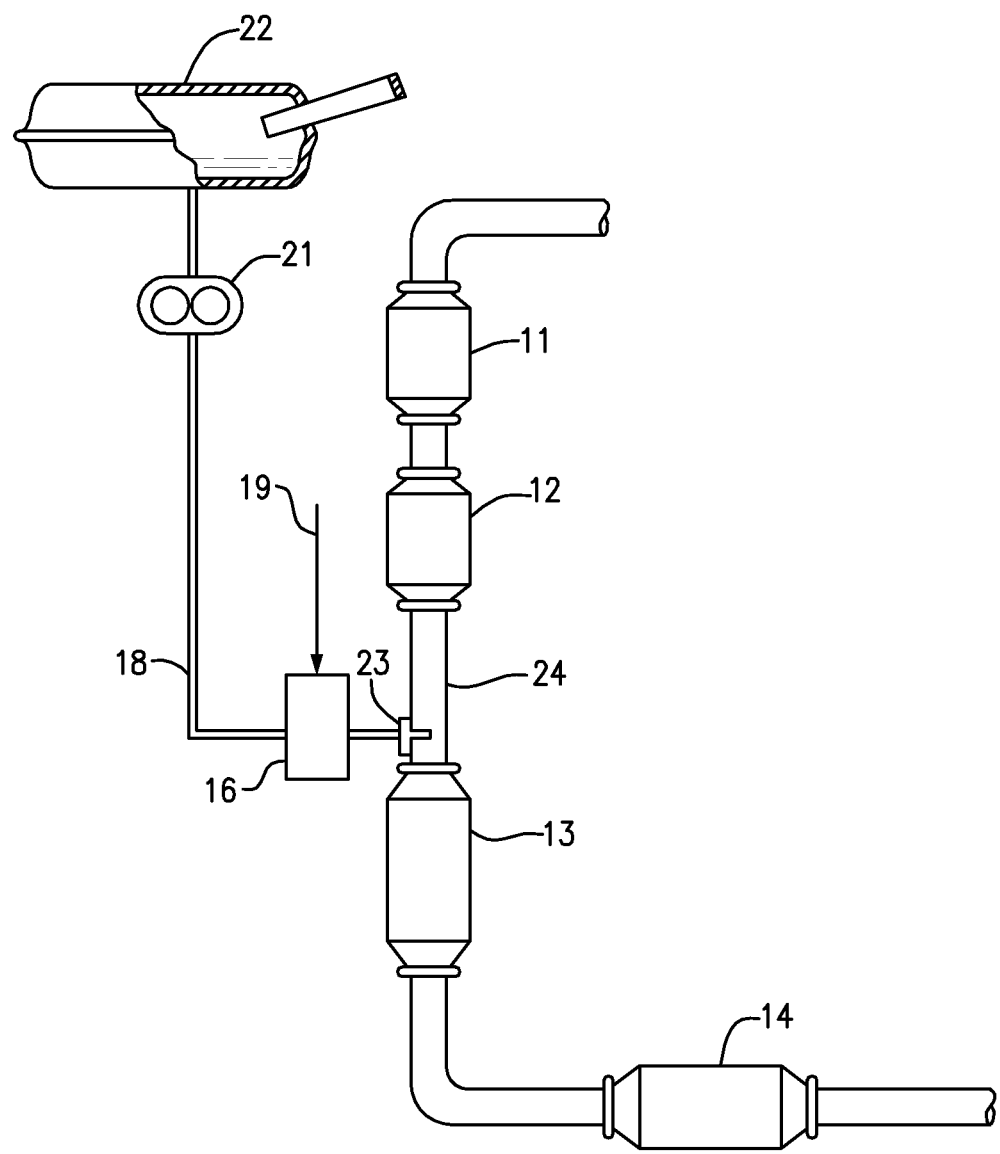
FIG. 4 shows an embodiment of an embodiment of an emission treatment system of the invention that includes a urea reservoir and injector.

In the embodiment of FIG. 4, an aqueous urea reservoir 22 stores a urea/water solution aboard the vehicle which is pumped through a pump 21 including a filter and pressure regulator to a urea injector 16. Urea injector 16 is a mixing chamber which receives pressure regulated air on line 19 which is pulsed by a control valve to urea injector 16. An atomized urea/water/air solution results which is pulse injected through a nozzle 23 into exhaust pipe 24 upstream of the SCR catalyst 13.

This invention is not limited to the aqueous urea metering arrangement shown in FIG. 4. It is contemplated that a gaseous nitrogen based reagent may be utilized. For example, a urea or cyanuric acid prill injector can meter solid pellets of urea to a chamber heated by the exhaust gas to gasify the solid reductant (sublimation temperature range of about 300 to 400° C.). Cyanuric acid will gasify to isocyanic acid (HNCO) and urea will gasify to ammonia and HNCO. With either reductant, a hydrolysis catalyst can be provided in the chamber and a slip stream of the exhaust gas metered into the chamber (the exhaust gas contains sufficient water vapor) to hydrolyze (temperatures of about 150 to 350° C.) HNCO to produce ammonia.

In addition to urea and cyanuric acid, other nitrogen based reducing reagents or reductants especially suitable for use in the control system of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

Upstream of the reductant dosage system is an oxidation catalyst (or DOC). The oxidation catalyst can be formed from any composition that provides effective combustion of unburned gaseous and non-volatile hydrocarbons (i.e., the VOF) and carbon monoxide. In addition, the oxidation catalyst should be effective to avoid conversion of a substantial proportion of the NO of the $NO_x$ component to $NO_2$ such that there is substantially no additional $NO_2$ in the exhaust gas that exits the oxidation catalyst compared to the amount of $NO_2$ in the exhaust gas prior to entering the oxidation catalyst. The exact catalyst composition and loading providing that regulates the amount of $NO_2$ exiting the oxidation catalyst will depend on the particular application and factors such as whether the engine is a heavy duty diesel engine, a light duty diesel engine, the operating temperature, space velocity and other factors. Suitable catalysts for the oxidation include platinum group metal- and base metal-based compositions. The catalyst compositions can be coated onto honeycomb flow-through monolith substrates formed of refractory metallic or ceramic (e.g., cordierite) materials. Alternatively, oxidation catalysts may be formed on to metallic or ceramic foam substrates which are well-known in the art. These oxidation catalysts, by virtue of the substrate on which they are coated (e.g., open cell ceramic foam), and/or by virtue of their intrinsic oxidation catalytic activity provide some level of particulate removal. The oxidation catalyst may remove some of the particulate matter from the exhaust stream upstream of the wall flow filter, since the reduction in the particulate mass on the filter potentially extends the time before forced regenerations.

One suitable oxidation catalyst composition that may be used in the emission treatment system contains a platinum group metal (PGM) component (e.g., platinum, palladium or rhodium components) dispersed on a high surface area, refractory oxide support (e.g., γ-alumina) which is combined with a zeolite component (for example, a beta zeolite).

Platinum group metal-based compositions suitable for use in forming the oxidation catalyst are also described in U.S. Pat. No. 5,100,632 (the '632 patent) hereby incorporated by reference. The '632 patent describes compositions that have a mixture of platinum, palladium, rhodium, and ruthenium and an alkaline earth metal oxide such as magnesium oxide, calcium oxide, strontium oxide, or barium oxide.

Catalyst compositions suitable for the oxidation catalyst may also be formed using base metals as catalytic agents. For example, U.S. Pat. No. 5,491,120 (the disclosure of which is hereby incorporated by reference) discloses oxidation catalyst compositions that include a catalytic material having a BET surface area of at least about 10 m2/g and consist essentially of a bulk second metal oxide which may be one or more of titania, zirconia, ceria-zirconia, silica, alumina-silica, and α-alumina.

As noted above, the configuration shown in FIG. 1 offers several advantages for the overall system functionality. First, having the DOC in the first position allows it to be placed as close as possible to the engine ensuring rapid heat up for cold start HC and CO emissions and the maximum DOC inlet temperature for active filter regeneration.

Second, the CSF being in front of the SCR will prevent particulate, oil ash and other undesirable materials from being deposited on the SCR catalyst thus improving its durability and performance.

Third, having oxidation catalysts in front of the SCR allows for an increase in the $NO_2$ to NO ratio entering the SCR which is known to increase the reaction rate of the $NO_x$ reduction occurring in the SCR if properly controlled.

However, the optimal control of the NO to $NO_2$ ratio entering the filter can be an issue with the large volume of oxidation catalyst that is present in the DOC and CSF in front of the SCR. According to one or more embodiments, proper system design provides for the control of the NO to $NO_2$ ratio into the SCR using a novel combination of DOC and diesel filter catalysts.

Figure 5:
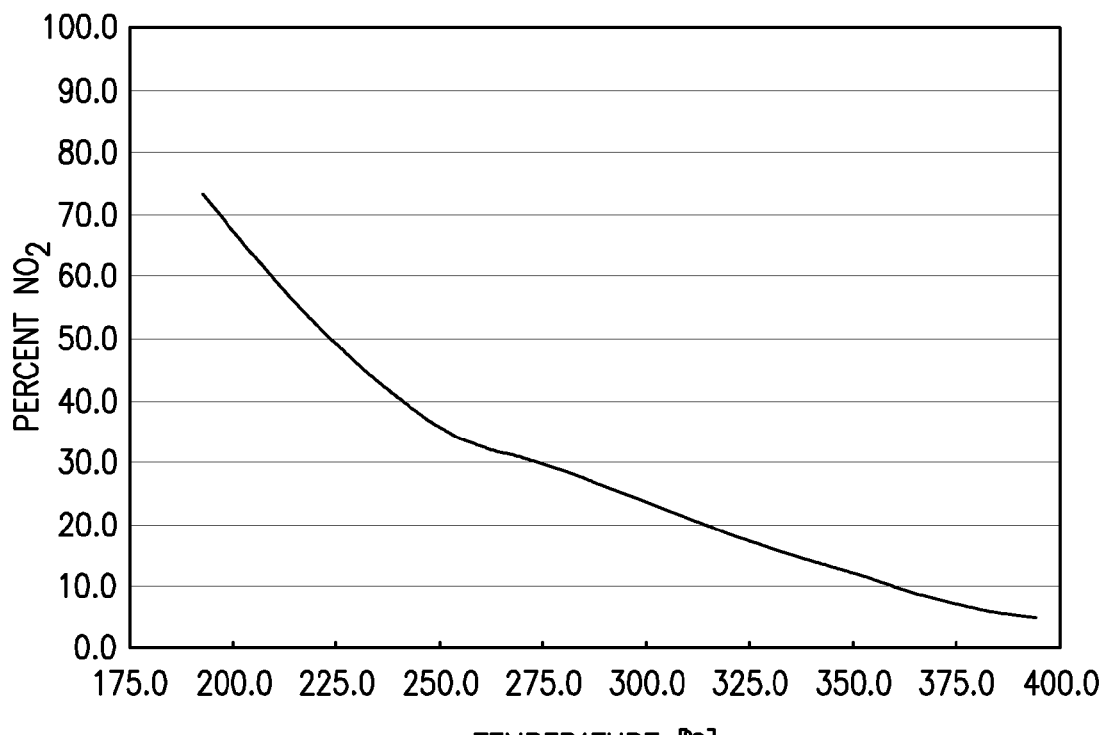
FIG. 5 shows a graph of the percentage of $NO_2$ in the $NO_x$ as a function of temperature.
Figure 6:
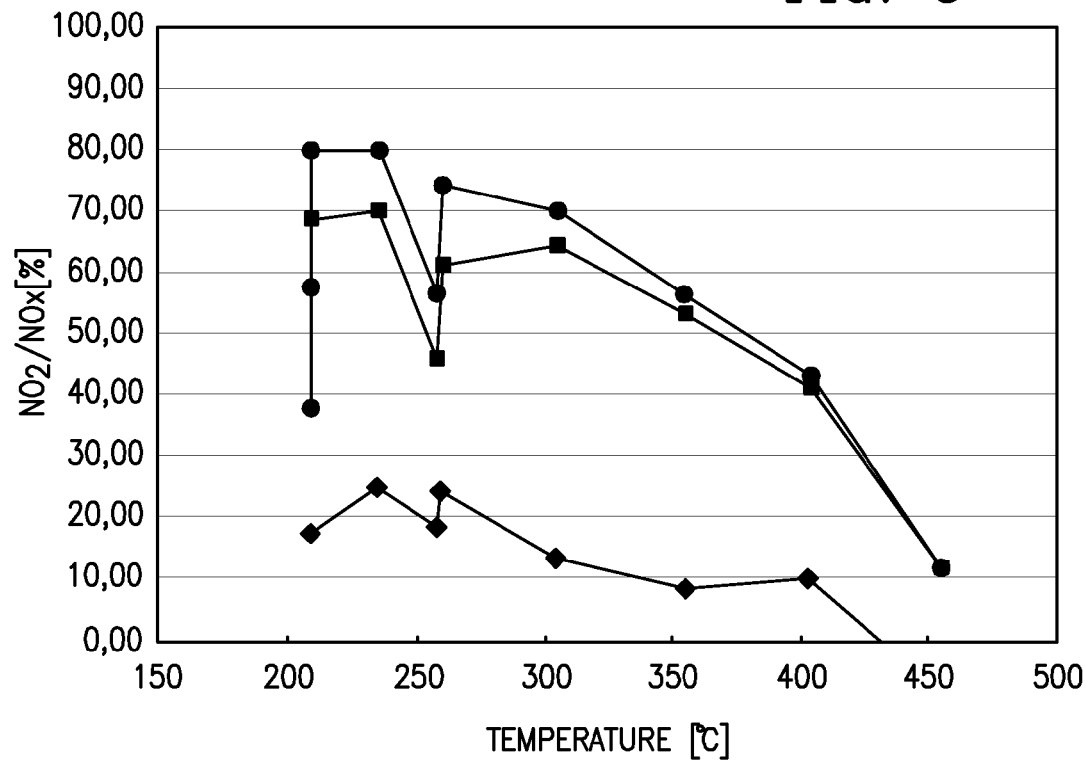
FIG. 6 shows a graph of the percentage of $NO_2$ in the $NO_x$ as a function of temperature.
Figure 7:
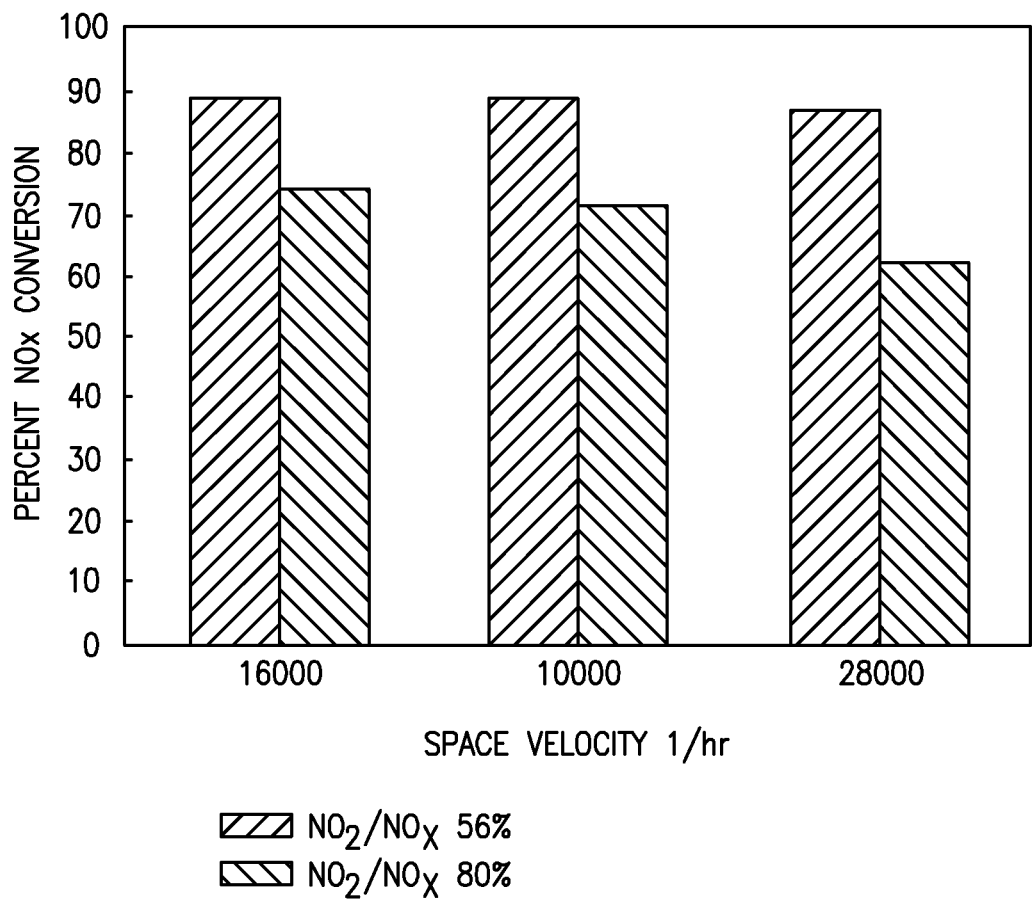
FIG. 7 shows a graph of the SCR performance relative to the $NO_2/NO_x$ ratio.

Data shows that the engine out $NO_2$ percentage of $NO_x$ can vary depending on the engine design, the exhaust temperature and the load. See FIG. 5. The optimal NO to $NO_2$ ratio for improving the selective catalytic reduction reaction rate is 1:1 (50% concentration), it can be seen in the data in FIG. 6 that even the engine out $NO_2$ can be above the optimal ratio. In the event the DOC is too active and contains a significant amount of platinum necessary for burning fuel for active regeneration and a CSF with platinum, the $NO_2$ concentration often exceeds the optimal NO to $NO_2$ (or $NO_2$ to NOx) ratio. See FIG. 6. This can be an issue because if the concentration of $NO_2$ becomes too high, the $NO_x$ reduction reaction becomes inhibited. See FIG. 7, in which the lower NOx conversions shown as the shorter bars in the graph are produced when the $NO_2$ to total NOx is 80%. However, under similar conditions, when the $NO_2$ to total NOx ratio is 56%, the NOx conversion is higher.

Figure 8:
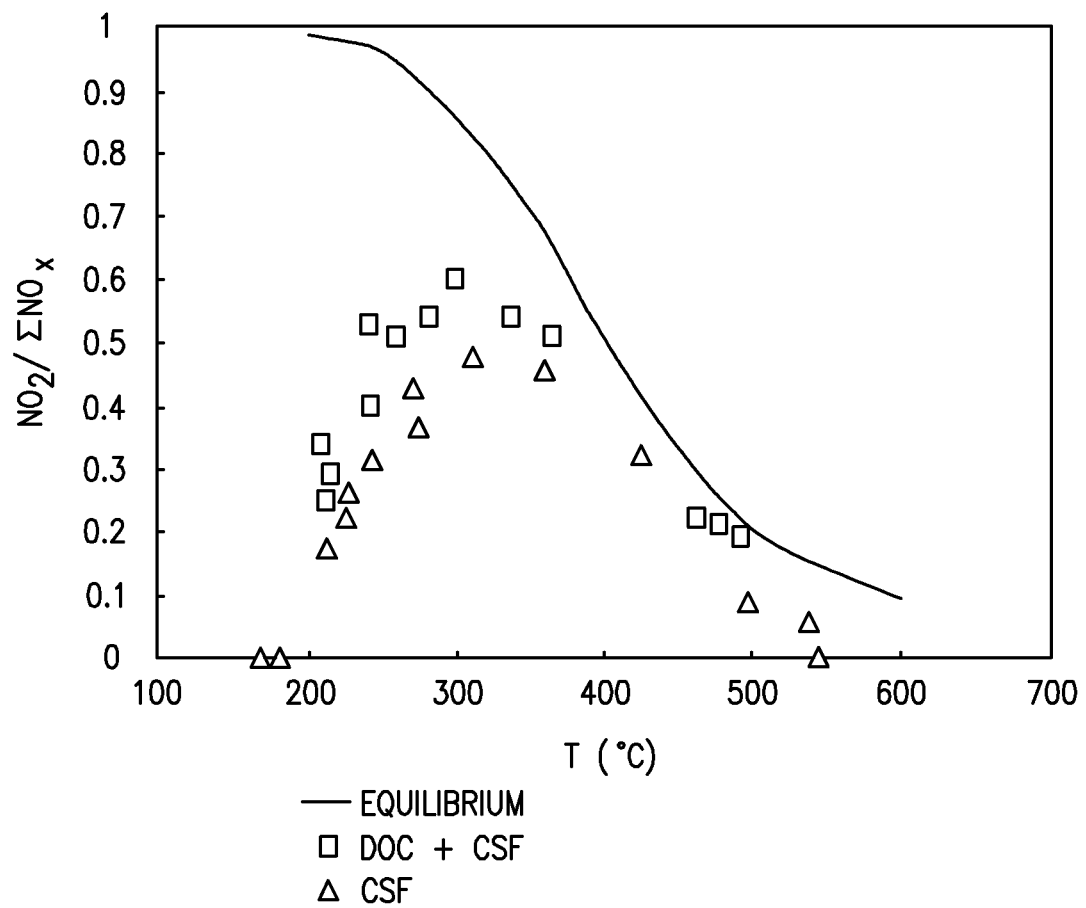
FIG. 8 shows a graph of the DOC contribution to the outlet $NO_2$.
Figure 9:
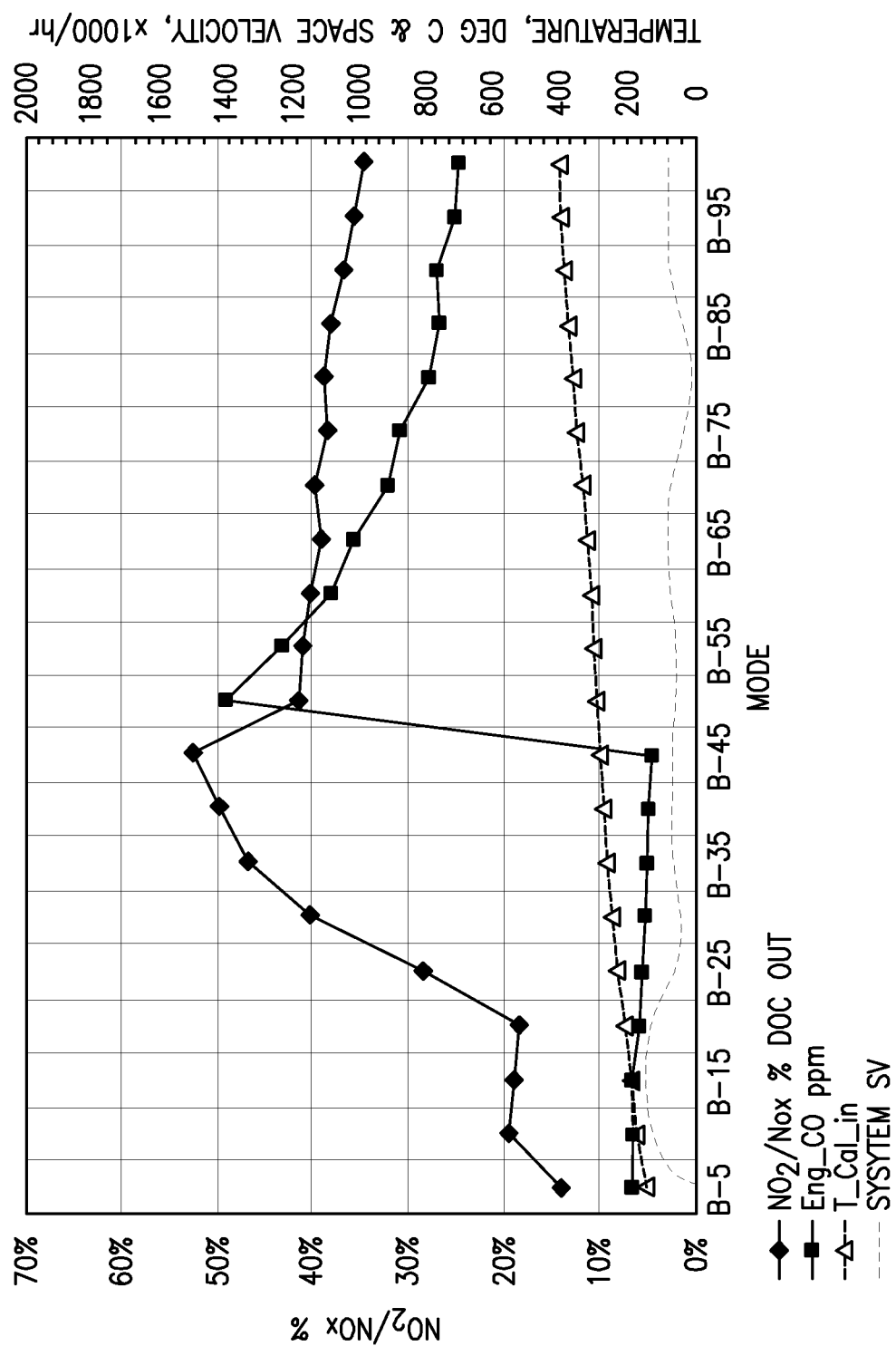
FIG. 9 shows a graph of the % $NO_2/NO_x$ at the DOC outlet.

Additionally, data has shown that the majority of $NO_2$ available at the inlet of the SCR catalyst is produced in the CSF. See FIG. 8. In addition to having only a small effect on the overall amount of $NO_2$ entering the SCR catalyst the $NO_2$ out of the DOC can be affected by the engine out CO and HC concentrations. See FIG. 9.

Figure 10:
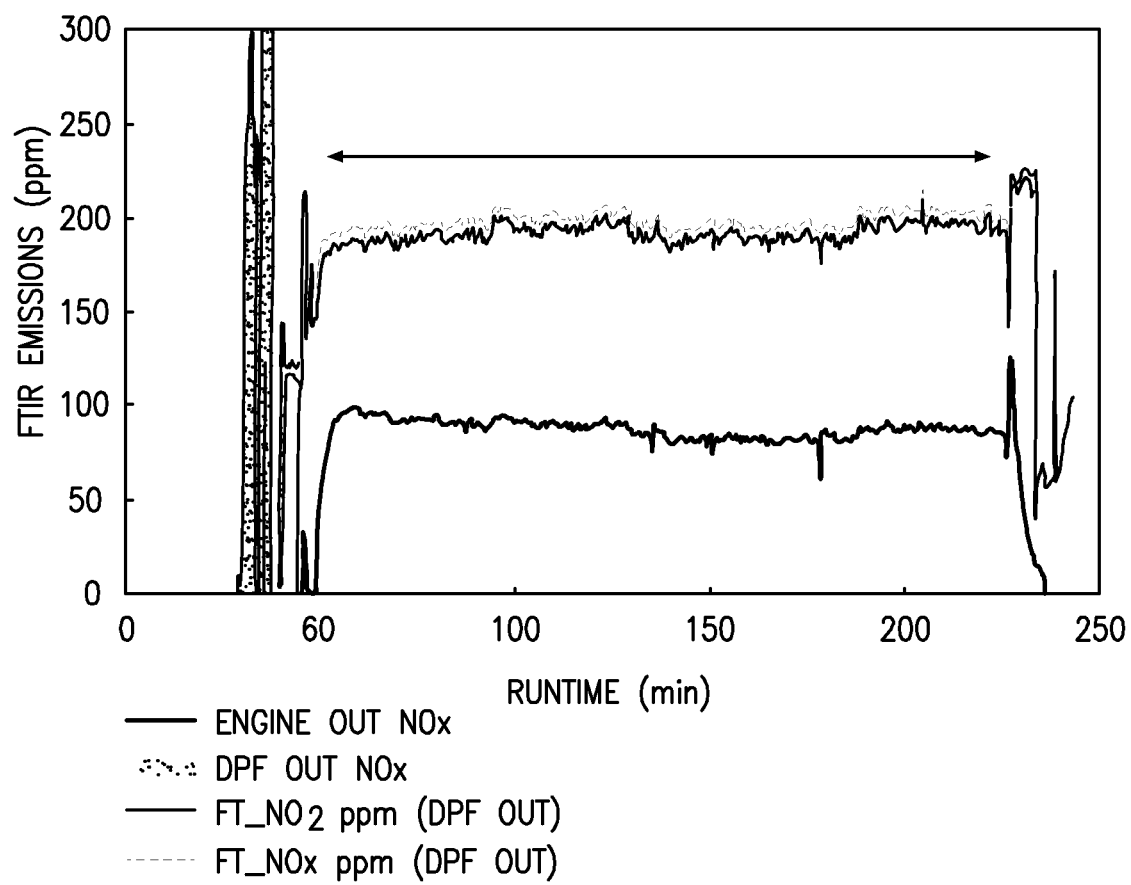
FIG. 10 shows a graph of the FTIR emissions as a function of time for a 3 hour soot-loading test.

Since the $NO_2$ produced in the DOC must pass through the CSF and as the CSF builds a soot layer on the inlet channel walls, the $NO_2$ generated by the DOC will react with the soot and revert back to NO. The extent of this reaction will be dependent on the thickness of the soot layer thus it will be variable. Therefore, the amount of $NO_2$ generated by the DOC that actually makes it to the SCR is variable and unreliable. However, the generation of $NO_2$ over the CSF is much more controllable because the DOC will have oxidized almost all of the HC and CO coming from the engine and the CSF PGM loading will drive the NO to $NO_2$ toward equilibrium for the given conditions regardless of the amount of soot in the filter. See FIG. 10.

Figure 11:
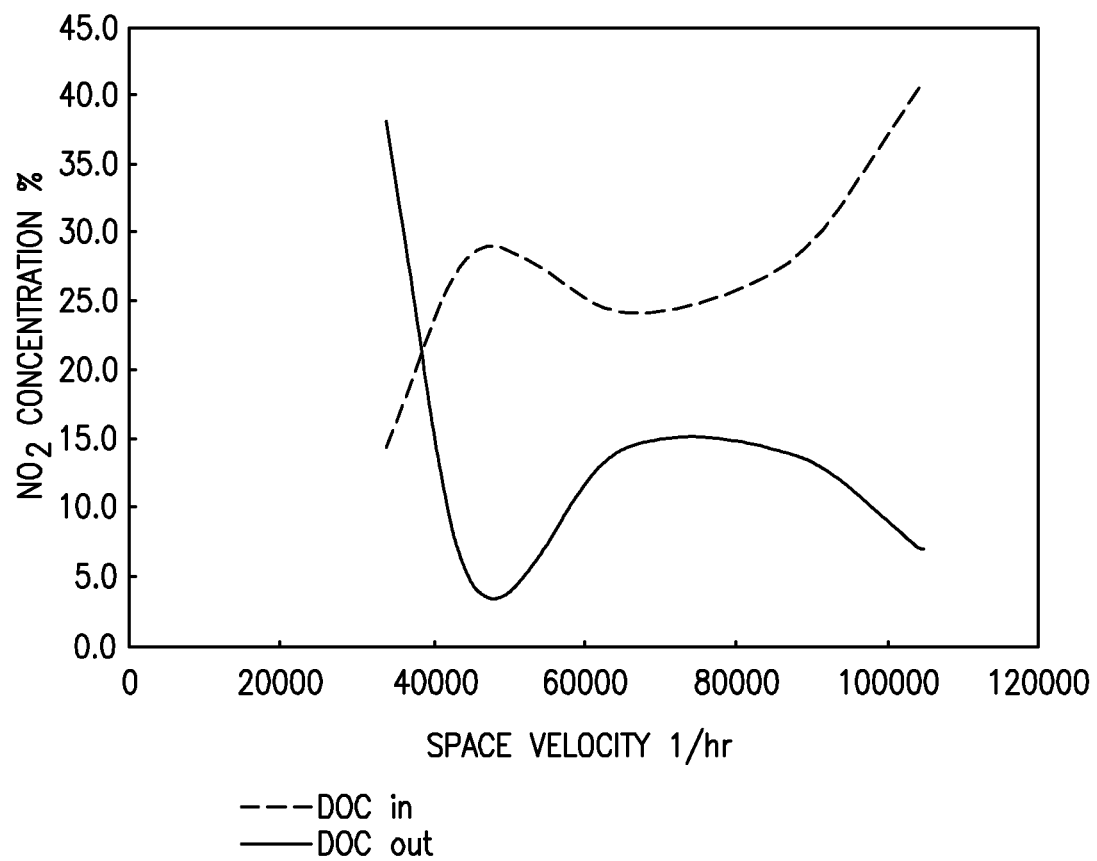
FIG. 11 shows a graph of the $NO_2$ conversion across the DOC at 275° C.

Embodiments of the invention are able to utilize a DOC that makes little or no $NO_2$ compared to engine out in combination with an optimized CSF designed to provide the proper NO to $NO_2$ ratio for optimal SCR operation. See FIG. 11.

A properly designed DOC can be configured to contain a catalyst that is effective produce little or no $NO_2$ compared to the engine out emissions. See Table 1 and FIG. 11.

TABLE 1

| Steady State Point | SV x000 $hr^{-1}$ | Temp ° C. | Engine Out (ppm) | | | | DOC out | | |
|---|---|---|---|---|---|---|---|---|---|
| | | | $NO_x$ | $NO_2/NO_x$ | HC | CO | $NO_2/NO_x$ | % HC Conv | % CO Conv |
| 1 | 87 | 510 | 412 | 0.073 | 59 | 413 | 0.095 | 69.9 | 97.6 |
| 2 | 64 | 530 | 336 | 0.08 | 50 | 472 | 0.065 | 72.1 | 99.1 |
| 3 | 38 | 430 | 217 | 0.158 | 152 | 1054 | 0.2 | 90.1 | 99.8 |
| 4 | 29 | 384 | 214 | 0.179 | 240 | 994 | 0.302 | 92.9 | 99.8 |
| 5 | 20 | 270 | 231 | 0.252 | 274 | 1229 | 0.398 | 94.5 | 99.9 |
| 6 | 20 | 260 | 122 | 0.384 | 410 | 1721 | 0.275 | 94.6 | 99.9 |
| 7 | 19.3 | 195 ± 5 | 278 | 0.111 | 217 | 235 | 0.075 | 77 | 99.8 |

The optimization of the DOC according to one or more embodiments includes the utilization of platinum group metals such as platinum and palladium in appropriate ratios, loadings and distribution on the substrate to optimize HC and CO conversion and active regeneration of the filter while making little or no $NO_2$. This optimization will allow the removal of Platinum (the primary catalyst for making $NO_2$) from the DOC thus reducing the overall cost of the DOC. This allows more platinum to be utilized on the CSF where it will give the most benefit for generating $NO_2$ for the SCR.

This design offers many benefits, including the opportunity for lower Pt loading on the DOC, reducing the cost. The opportunity to increase the use of Pd on the DOC, increasing the Pd to Pt ratio, improving the thermal durability of the DOC. Allowing a more stable NO to $NO_2$ ratio into the filter. Allowing better utilization of the system PGM by placing more PGM and more Pt on the filter. Allowing for the optimization of the filter for $NO_2$ production for the SCR which creates a system that is amore able to provide the optimal NO to $NO_2$ ratio for proper SCR operation.

Accordingly, one or more embodiments of the invention are directed toward emission treatment systems for treatment of an exhaust stream from an engine, the exhaust stream comprising $NO_x$ and particulate matter. The emission treatment system comprises a diesel oxidation catalyst located downstream from the engine. The $NO_x$ is comprised of at least NO and $NO_2$. The DOC is placed within the path of the exhaust gas stream. The diesel oxidation catalyst produces substantially no additional $NO_2$ in the exhaust gas stream after passing through the diesel oxidation catalyst. In one or more embodiments, the DOC operates in this manner over about 90% of the operating window of the diesel oxidation catalyst. Optionally, according to one embodiment of the invention have the diesel oxidation catalyst further comprises a first platinum group metal (PGM) zone followed by a second PGM zone, the second zone contains different precious metal loading, types of PGM and/or mixtures of PGM than the first zone.

A catalyzed soot filter is located downstream from the diesel oxidation catalyst. According to one embodiment, the CSF is a wall flow filter that has a plurality of longitudinally extending passages bounded by longitudinally extending walls. The passages comprises inlet passages having an open inlet end and a closed outlet end, and outlet passages having a closed inlet end and an open outlet end. The catalyzed soot filter comprises an oxidation catalyst composition on the walls, and the catalyzed soot filter is effective to optimize the ratio of NO to $NO_2$ exiting the filter.

A $NO_x$ reducing catalyst is located downstream from the catalyzed soot filter. The emission treatment system according to one or more embodiments has a selective catalytic reduction catalyst as the $NO_x$ reducing catalyst. In other embodiments, other types of NOx reducing catalysts may be used such as a lean NOx trap.

Further embodiments of the emission treatment system also include a reductant injection system. The reductant injection system is located between the catalyzed soot filter and the $NO_x$ reducing catalyst. In some embodiments of this sort, an ammonia oxidation catalyst is disposed downstream from the $NO_x$ reducing catalyst.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While the foregoing is directed to embodiments of the present invention, other and further embodiments of the invention may be devised without departing from the basic scope thereof, and the scope thereof is determined by the claims that follow.

What is claimed:

1. A method of treating an exhaust stream from a diesel engine, the exhaust stream comprising NOx and particulate matter, the method comprising:
    disposing within an exhaust stream containing $NO_2$ a diesel oxidation catalyst (DOC), wherein the DOC comprises platinum and palladium dispersed on a refractory metal oxide which is mixed with a zeolite component, the diesel oxidation catalyst producing no $NO_2$ in the exhaust stream exiting the diesel oxidation catalyst by increasing the ratio of Pd:Pt;
    disposing a catalyzed soot filter comprising platinum downstream from the diesel oxidation catalyst, the catalyzed soot filter having a plurality of longitudinally extending passages bounded by longitudinally extending walls, the passages comprising inlet passages having an open inlet end and a closed outlet end, and outlet passages having a closed inlet end and an open outlet end, the catalyst soot filter comprising a catalyst composition on the walls, the catalyst soot filter effective to optimize the ratio of NO to $NO_2$ exiting the filter;
    disposing a selective catalytic reduction catalyst downstream from the catalyzed soot filter; and passing the exhaust stream from the diesel engine through the diesel oxidation catalyst, the catalyzed soot filter and the selective catalytic reduction catalyst,
    wherein the $NO/NO_2$ ratio exiting the catalyst soot filter is between 0.6 and 1.4, wherein control of the NO to $NO_2$ ratio of the exhaust gas flowing into the SCR is provided by using the combination of the DOC and the CSF.

2. The method of claim 1, further comprising disposing a reductant injection system between the catalyzed soot filter and the selective catalytic reduction catalyst, the reductant injection system periodically adding a reductant into the exhaust stream exiting the catalyzed soot filter.

3. The method of claim 2, further comprising disposing an ammonia oxidation catalyst subsequent to the selective catalytic reduction catalyst.

4. The method of claim 1, further comprising metering a reductant into the exhaust stream prior to selective catalytic reduction catalyst.

5. The method of claim 4, further comprising oxidizing residual reductant subsequent to the selective catalytic reduction catalyst.

* * * * *